US008990918B2

(12) United States Patent
Dunstan

(10) Patent No.: US 8,990,918 B2
(45) Date of Patent: Mar. 24, 2015

(54) SYSTEM AND METHOD FOR PROVIDING A SECURE NETWORK ON ANOTHER SECURE NETWORK

(71) Applicant: John Henry Dunstan, Caledon (CA)

(72) Inventor: John Henry Dunstan, Caledon (CA)

( * ) Notice: Subject to any disclaimer, the term of this patent is extended or adjusted under 35 U.S.C. 154(b) by 0 days.

(21) Appl. No.: 13/888,351

(22) Filed: May 6, 2013

(65) Prior Publication Data

US 2013/0312080 A1 Nov. 21, 2013

Related U.S. Application Data

(62) Division of application No. 13/054,957, filed as application No. PCT/CA2009/001070 on Jul. 30, 2009, now abandoned.

(30) Foreign Application Priority Data

Jul. 30, 2008 (CA) .................................... 2637179

(51) Int. Cl.
| | |
|---|---|
| H04L 29/06 | (2006.01) |
| G06Q 10/06 | (2012.01) |
| G06Q 20/02 | (2012.01) |
| G06Q 30/06 | (2012.01) |
| G07F 19/00 | (2006.01) |

(52) U.S. Cl.
CPC ............ *H04L 63/0281* (2013.01); *G06Q 10/06* (2013.01); *G06Q 20/02* (2013.01); *G06Q 30/06* (2013.01); *G07F 19/208* (2013.01); *H04L 63/20* (2013.01); *H04L 63/08* (2013.01)
USPC ............................................ 726/12

(58) Field of Classification Search
CPC ..... H04L 63/0815; H04L 67/28; H04L 29/06; H04L 63/20
USPC ............................................ 726/12
See application file for complete search history.

(56) References Cited

U.S. PATENT DOCUMENTS

2004/0128393 A1 * 7/2004 Blakley et al. ................ 709/229

FOREIGN PATENT DOCUMENTS

WO     WO 00/11832     *    3/2000    ................. H04L 9/00

* cited by examiner

*Primary Examiner* — Jason K Gee
(74) *Attorney, Agent, or Firm* — Robert Graham; Ridout & Maybee LLP

(57) ABSTRACT

The present invention provides a system and method for providing a closed or secure network on another closed or secure network. The system enables linking at least one acquirer network operating a closed network to at least one operator by a central server. The acquirer network includes one or more terminals and optionally an acquirer server. The central server is linked to the acquirer network and to the operator. The central server is configurable to communicate with at least a subset of the one or more terminals, and also with the operator, and to establish one or more serve; communication links between the operator and the one or more terminals. The central server acts as a trusted intermediary between the acquirer network and the operator for enabling the operator to communicate with the one or more terminals via the closed acquirer network.

18 Claims, 6 Drawing Sheets

Game type specific (LOGO)

ENTRY COST       $ XX

THIS ENTRY SUCCESSFUL

KEEP THIS RECEIPT FOR A WINNING GAME CLAIM

Game No.     XXXX

Date  YYYY/MM/DD

User Selections

X           —

X           —

X

Merchant No. xxxxxx

XXXXXXXX Street,

CITY xxx

Namexxx xxxxx

Card # xxxxxxxxx

Entry:

Ticket No.

xxxx-xxxx-xxxx-xxxxx

FIG. 6

SYSTEM AND METHOD FOR PROVIDING A SECURE NETWORK ON ANOTHER SECURE NETWORK

RELATED APPLICATIONS

This patent application is a divisional application of U.S. patent application Ser. No. 13/054,957, filed Jul. 30, 2009, entitled "System and Method for Providing a Secure Network on Another Secure Network", and claims the benefit of the filing date of Canadian Patent Application No. 2,637,179, filed Jul. 30, 2008.

FIELD OF THE INVENTION

The present invention provides a system and method for providing a closed or secure network on another closed or secure network. More specifically, the present invention provides a system and method for enabling an operator of a closed or secure network to operate over a terminal network without compromising the closed nature of either network.

BACKGROUND OF THE INVENTION

Electronic Fund Transfer (EFT) devices at the point of sale, referred to as any of, EFT-POS devices, PIN Pads, chip and PIN card readers, signature terminals, payment devices, or authorization terminals (collectively referred to herein as "terminals"), are widely deployed to end user locations with merchants and retail outlets. These terminals at the point of sale enable customers to transact with merchants using a secure payment means, such as a credit card or bank debit card. Typical terminals include various card readers for example magnetic stripe readers, smart card readers and/or contactless device interface readers, for example RFID readers. Some terminals have in-built printers. Some terminals interface and have connectivity with the point of sale electronic cash registers.

The terminals have user interfaces which include various screens, touch-screens, keypads and/or stylus pens for touch screen signature capture. The terminals are tamper proof and support several security services and are typically capable of authenticating a secure personal identification number using cryptographic techniques including an encrypted keypad and encrypted messaging. The terminals typically support peripherals and related messaging with controllers, electronic cash registers, bar code readers, optical mark sense readers and printers.

The terminals are primarily used for initiating electronic funds transfer. Within the financial services payments industry is a sector known as the Retail Electronic Payment Systems (REPS). The REPS execute point of sale payments that are completed spontaneously at a location other than the acquirer. The REPS is comprised of: credit card systems, Electronic Funds Transfer (EFT) systems primarily deployed for debit card processing, and cash acceptance and bill payments systems. Major payment functions include: authorization and customer credit and debit card transactions, capture of sales draft information over a secured network.

These terminals and REPS provide a far reaching established network, however the network is operated by an acquirer, which could for example be a bank or other financial institution. Therefore, the acquirer has control and access to all devices and data communicated over its network.

Many entities have a need of distributing their products or services at multiple locations, leveraging for example retailer locations. These entities (referred to as an "operator") often use their own networks (with their hardware, software and network components) to distribute their products or services. An example is a lottery corporation, which often uses proprietary lottery stations and has a need for broadly distributed proprietary network. The distribution and maintenance of the hardware, software and network components to provide this proprietary network requires initial and ongoing costs, including potentially a purchase cost to the merchant or operator and a maintenance cost for the operator.

Lotteries have a pressing need to increase the quantity of points of sales and expand into new sales channels to follow consumer spending locations and demographic segments. A primary driver of lottery sales is the density and consumer convenience of the lottery sales terminal. Expanding access points is limited by the cost of the dedicated full service terminals requiring retailer high minimum weekly sales and/or the availability the full service terminals. However, lottery operators are constrained in their ability to leverage existing networks owned by others, as there is a high sensitivity of data communicated during lottery transactions, coupled with the reluctance of the REPS to permit access by others which may compromise REPS security.

US patent publication 20030228910 discloses a lottery management system. A means is provided for connecting a third party device with a lottery network. However, this invention merely connects a foreign device to a lottery network through a connectivity network. The third party device and its connectivity network may be either open for installing applications/connectivity or under the control of the lottery operator or its player-customer. It does not overcome the limitation that the data is available to the foreign network operator or attackers.

It would be beneficial to enable operators, such as lotteries, to leverage the REPS network and their terminals. However, it is not realistic to expect operators to expose their communicated data to another party, such as the acquirer, potential attackers or even other operators. Nor do acquirers want to expose their merchant information to operators or other acquirers.

What is required is a system and method for enabling one or more operators to leverage one or more networks of terminals operated by one or more acquirers without compromising the performance or security of the closed nature of either network. Multiple operators need to communicate with multiple acquirers. Sometimes an operator may legally only communicate to a subset of the acquirer's terminals.

SUMMARY

The present invention provides a system for linking at least one acquirer network operating a closed network to at least one operator, the acquirer network including one or more terminals and optionally an acquirer server, the system characterized by a central server linked to the acquirer network and to the operator, the central server configurable to communicate with at least a subset of the one or more terminals, and also with the operator, and to establish one or more communication links between the operator and the one or more terminals, wherein the central server acts as a trusted intermediary between the acquirer network and the operator for enabling the operator to communicate with the one or more terminals via the closed acquirer network.

The present invention also provides a computer-network-implementable method for linking at least one acquirer network operating a closed network to at least one operator, the acquirer network including one or more terminals and optionally an acquirer server, the method characterized by: (a) linking a central server to the acquirer network and to the operator; and (b) configuring, or facilitating the configuring, by one or more computer processors, the central server to communicate with at least a subset of the one or more terminals, and also with the operator, and to establish one or more communication links between the operator and the one or more terminals, so as to enable the central server to act as a trusted intermediary between the acquirer network and the operator for enabling the operator to communicate with the one or more terminals via the closed acquirer network.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE DRAWINGS

FIG. 6 illustrates an example of a print-out of a lottery entry ticket of the terminal resulting from an example usage of the lottery application.

DETAILED DESCRIPTION

Overview

The present invention enables a closed network (as defined below) to operate on the network infrastructure of another closed network. More specifically, the present invention enables an operator (e.g. a lottery corporation-see below) to exchange communications with one or more network devices (e.g. terminals as described below) associated with an acquirer's network (e.g. a financial institution's electronic payment network) despite the closed aspect of the acquirer network, for example because of security requirements associated with the acquirer network. The present invention enables the linking of the operator network and the acquirer network for communication between them, and specifically between acquirer's network devices and one or more servers associated with the operator, without compromising the closed nature, security and performance of either network. A range of security services provided in accordance with the present invention enable device authentication, data origination authentication, and entity authentication, thereby maintaining data privacy and integrity as particularized below.

The acquirer generally require device and data origination authentication while the operator require entity authentication (e.g. of a user of an acquirer terminal), which provides non-repudiation for transactions with the operator, and involving one or more of the acquirer's terminals by operation of the linking of the acquirer network and operator network (or network components of such networks), as described herein.

In accordance with the present invention, said linking of the operator network and acquirer network is achieved by the central server described below, which acts as a trusted intermediary to enable the communications referred to above between the operator and one or more terminals, across the acquirer network.

Figure 1:
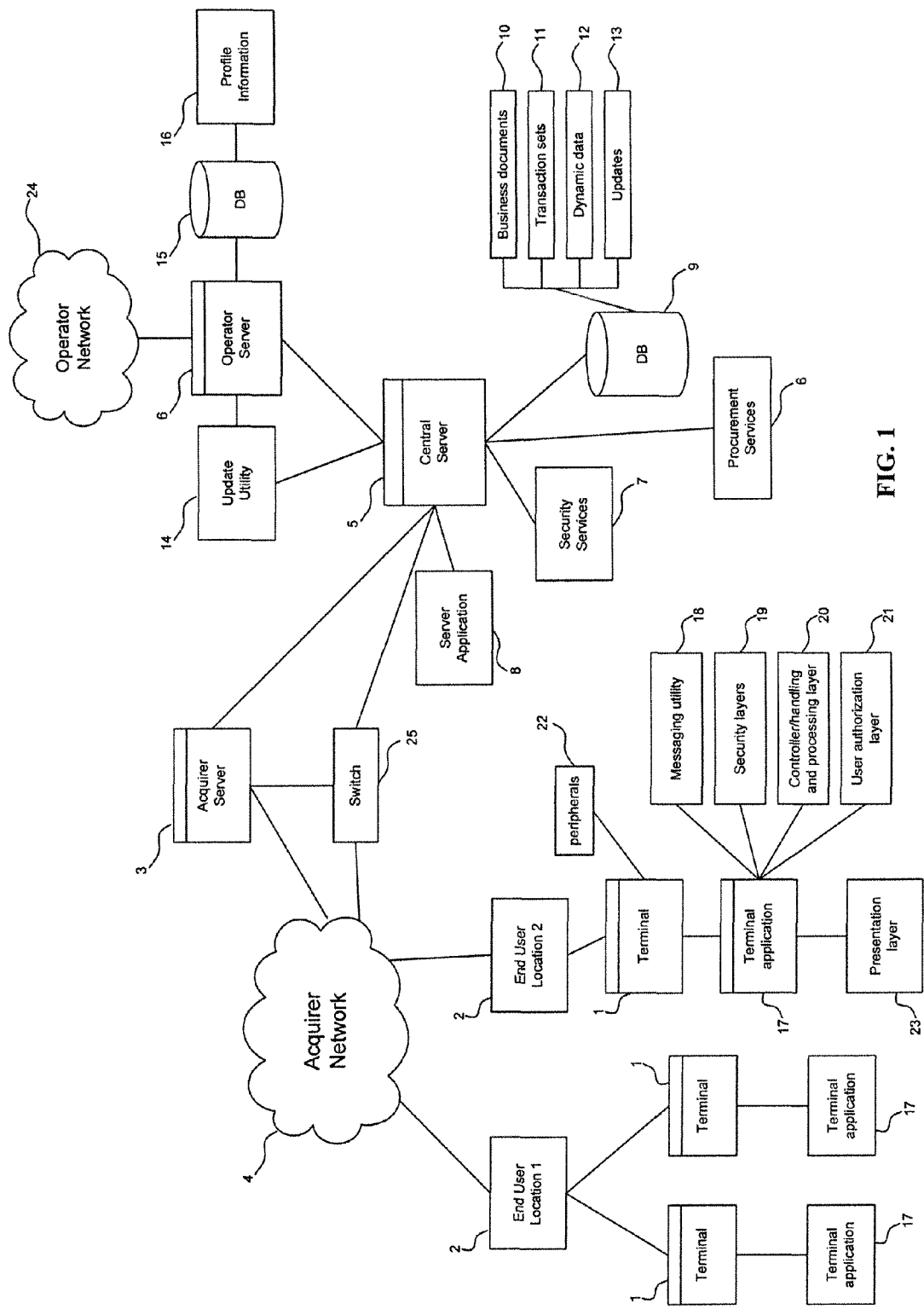
FIG. 1 illustrates an example system in accordance with the present invention.

With reference to FIG. 1, the system of the present invention comprises: (a) an acquirer network 4; (b) an operator network 24; (c) a central server 5 operated by a trusted third party; and (d) a plurality of terminals 1. Security services 7 may be provided by the central server 5 or by a security server linked to the central server 5. The acquirer network 4 and operator network 24 may be closed networks and need not share any data between themselves.

"Closed" network in this disclosure means that third parties may not access, load applications or communicate with the network's devices except with the network owner's participation, approvals and/or certifications.

It should be understood that an "acquirer" means a network owner or administrator, for example a bank or other financial institution, that provides merchants with transaction processing means including terminals. It is contemplated that an acquirer may subcontract certain aspects of its role as acquirer to one or more processors.

In one particular implementation, (a) the acquirer network 4 is operated by an acquirer; (b) the operator network 24 is operated by an operator; and (c) the central server 5 is operated by a trusted third party. However, it should be understood that any other operation model could be provided for these components.

The central server 5 provides a mechanism for linking the operator network 24 with the acquirer network 4, enabling the two closed networks to be linked such that the operator network 24 and related operations are extended to the acquirer network 4, or part thereof permitted by the acquirer and the operator. The linked or combined network, provided in accordance with the invention, and providing the access thereto to the operator as described herein may be referred to as a "linked network" in this disclosure, part of which is actually the acquirer network 4, but in relation to which the present invention enables the operator or its designates to "piggyback". In other words, the operator network 24 communications, by operation of the present invention, can ride over the acquirer network 4, or selected portions thereof This linking of the closed networks is enabled while maintaining acquirer's security services including data origination authentication, and maintaining the operator's security services including the ability to authenticate terminals for the purposes of merchant transactions based on its own authentication procedures. In one aspect, the present invention enables the operator to apply its security services and its user authentication procedures, including on the acquirer network 4, as further particularized below.

In one implementation of the invention, merchants may also operate their own networks of terminals, for the purposes for example of cost reduction (transactional costs) and to facilitate functionality that terminals provided by the financial institution may not permit, in which case for the purposes of the invention the merchant networks are part of the acquirer network with respect to enabling communications with the operator. The merchant's network may also be a closed network in which case the acquirer network comprises both the financial institution's closed network and the merchant's closed network. The merchant networks, including the terminals, may have their own authentication requirements. The security services described below may include enabling the merchant's authentication requirements to be addressed for enabling communications between the merchant terminals and the operator via the merchant network and the financial institution's network.

The central server 5 is operated by a trusted third party to facilitate security and privacy services so that acquirers and operators cannot access other parties' data. The operator does not have access to modify the central server 5, although there may be a mechanism for enabling the operator to provide business data updates and other content to the central server 5. The central server 5 enables certain security services 7 in relation to the communications being routed through the central server 5.

The operator network 24 may be linked to the acquirer network 4 by the central server 5 and could be further linked by The acquirer server 3 or another device, for example a switch 25, approved by the acquirer for routing, and may bypass the acquirer server 3 for certain transaction messages. For example, if the operator has provided its applications with signed code for use on the acquirer network 4, the acquirer may not require that the operator network 24 be linked to the acquirer network 4 by the acquirer server 3.

A plurality of terminals 1 are deployed to one or more retailers or other end user locations 2. The terminals 1 define nodes on both closed networks and are typically deployed by the acquirer. The central server 5 controls access to the operator network 24 by the terminals 1. The central server 5 can be configured to enable the operator to access all or a subset of the terminals 1, enabling the operator to select which terminals 1 it wishes to provide connectivity.

A terminal application 17 is delivered to the terminals 1, for example by operation of a network management system operated by or for the acquirer, which is operable to deliver application code to the terminals 1. Usually, any application code must be accepted by the acquirer prior to distribution to the terminals 1, which acceptance may include a certification process with application code signing in order to enable loading and installing the terminal application 17, and interoperation of the terminals 1 with the acquirer network 4, using the terminal application 17 and data origination authentication provided by the acquirer network 4.

The terminal application 17 provides user authentication whereby a user of the terminal 1 enables the operator to operate its network on the acquirer network 4. In other words, the terminal application 17 enables the terminal 1 to be used on the operator network 24 by authenticating the user of the terminal 1 by way of services of the central server 5. The terminal applications 17 configure the terminals 1 to provide the communication methods of the present invention. The terminal application 17 leverages the resources of the terminal 1 on which it resides and communicates with the acquirer network 4 and the central server 5.

The terminal applications 17 also receive from the central server 5 business documents 10, transaction sets 11, dynamic data 12, updates 13 to programming, and additional programming code to enable the communications described for the operator network 24 over the acquirer network 4. The acquirer servers 3 do not perform any the operator's business processes.

Each terminal application 17 comprises: (a) a messaging utility 18 for enabling the exchange of communications with the central server 5; (b) security layers 19 with optionally a data origination authentication utility and device authentication for authenticating the terminal to the acquirer server 3, particularly in a client/server implementation of the terminals where the terminal 1 is the client to the acquirer server 3; (c) a controller/handling and processing layer 20 for processing the transactions whether based on instructions that are part of the terminal application 17, or instructions provided dynamically by the acquirer server 3; (d) a user authentication layer 21 directed to the operator, and operable to authenticate an authorized user of the terminal 1 to the operator server 6, whether directly or indirectly by operation of the central server 5 as an authentication intermediary; and (e) a presentation layer 23 and user interface linked to the handling/processing layer for interacting with the user interfaces including keypad, displays, touch screens and printing etc.

It should be noted that the terminal application 17 may supplement the existing or proprietary application provided on the terminal 1 by the terminal manufacturer or the acquirer, in which case it could be executed along side or over top of the existing or proprietary application, or is executed by the existing or proprietary application. Alternatively, the terminal application 17 can replace the existing or proprietary application, by including in terminal application 17 the functionality of the proprietary application.

The role of these components of the terminal application 17 in enabling the method of the present invention is discussed in greater detail below.

The following describe example implementations of the components referred to above, and their functions. However, it should be understood that the components and functions of the invention may be provided in many other implementations, including for example on a distributed or integrated basis, whereby a smaller or larger number of components perform these functions. Furthermore the particular software structures described may be provided by other structures enabling the methods of the invention. Furthermore, control of the various components could be by other parties including on a committee basis or delegated basis.

Note that the terminal application 17 may include additional functionality or features. For example it may be desirable to include in the terminals 1 used in connection with the present invention (whether by operation of the terminals or the terminal application) functionality that prevents unauthorized third parties from accessing the terminals 1 or the terminal application 17 for the purpose of "listening" by using a known security technique for this purpose and thereby capturing transaction data processed by operation of the terminals.

The central server 5 manages and provides a number of services including security 7 and procurement services 6 and the communications between the terminals 1 and the operator server 6. The functions of the central server 5 are further described below.

Figure 2:
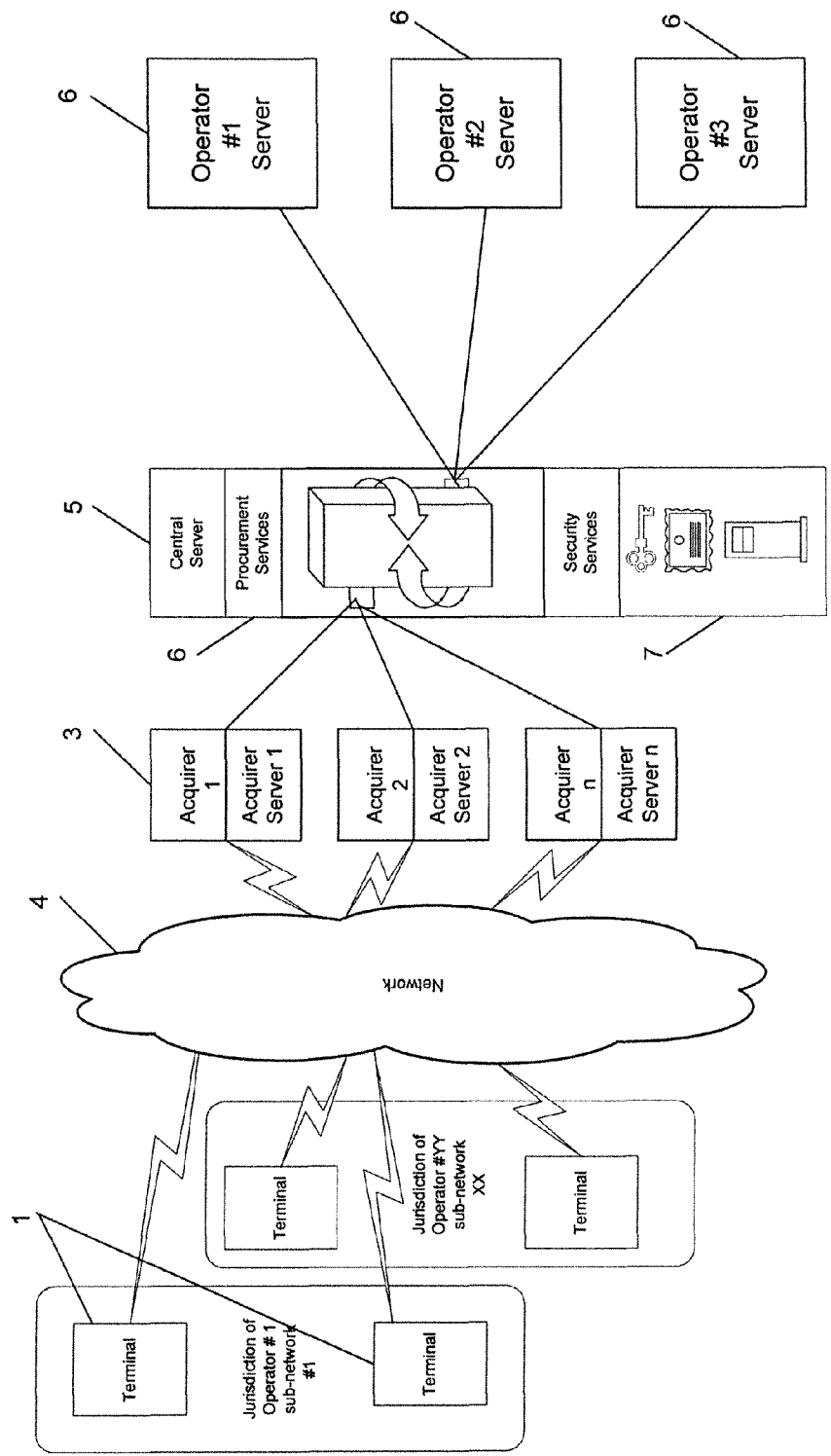
FIG. 2 illustrates the central server linked to a plurality of client/server architectures providing a plurality of sub-networks within the linked network.

Optionally, the central server 5 is linked to a plurality of such client/server architectures providing a plurality of sub-networks within the linked network, as best illustrated in FIG. 2. Each client/server architectures includes a plurality of terminals 1, usually associated with a single acquirer, and at least one acquirer server 3 to facilitate operation of the operator network using the acquirer network 4. The terminals 1 are linked to the acquirer server 3 for the purpose of managing communications associated with the operator server 6, but via the acquirer network 4, with the central server 5 acting as the trusted intermediary between the acquirer network 4, or network portion that is part of the linked network, and from an operator's perspective, the operator's closed network. While under certain implementations, operators/acquirers will require that each terminal 1 is associated with a single acquirer and a single operator, collaboration between the participating acquirers and operators is possible in accordance with the invention, which can enable many to many relationships implemented to the linked networks described.

Security services 7, for the benefit of the operator, are provided by the central server 5 or a central security server linked to the central server 5, or made part of the central server 5 by including security functions therein. Another operator security server may be associated with the operator server 6. Security services for the operator described herein could alternatively be provided by an operator security server, with the central server acting as an intermediary, or may be distributed between the central server's central security server and the operator security server. Details regarding the security services are provided below.

The central server 5 is linked to one or more databases 9. The databases 9 include at least one catalogue associated with each operator. The catalogue is best understood as a compilation of computer files associated with specific offerings of a particular operator. In a particular implementation of the invention the catalogues 9 includes a list of such specific offerings, captured as "business documents" 10. The business documents 10 are generated, for example by operation of the central server 5, based on the operator's specific business data provided, embodying data and processes associated with a specific offering and any related transactions. The operator's business data may include dynamic data, application code, configuration data and other objects required to process transactions by the operator, associated with the communications directed over the linked network. An example of business data and generation of business documents 10 is provided below.

It is also contemplated that the business documents 10 may include the parameters for the communications between the terminals 1 and the operator network 24 over the acquirer network 4 that is associated with a particular operator, for example content, processing or security aspects for enabling the operation of the operator network 24.

As stated earlier, the particular authentication parameters for accessing the operator network 24 and communicating messages on the operator network 24 are established by the operator. Thus the acquirer provides device and data origination authentication while the operator provides entity (or user) authentication. These authentication measures provide data privacy and integrity.

It should be understood that the generation of the business documents 10 from business data, made centrally available via the central server 5, aids in the implementation of the invention, particularly where there are multiple operator offerings; multiple operators; each operator having specific data and rules governing their transactions, for example, based on geographic considerations, transaction rules, regulatory rules, regulations and so on. In a particular implementation of the present invention, the business documents 10 form the basis for developing transaction sets 11 for the terminal application 17, or particular iterations or configurations thereof for particular sub-networks associated with specific operators, as described above. For example, the business documents 10 may be used to assist in the development of terminal applications 17 acceptable to particular acquirers, thus for example reducing the cost of achieving code acceptance of the terminal application 17, which is often a prerequisite for distribution of the terminal application 17 to terminals 1 controlled by a particular acquirer. The business documents 10 may be embodied in transaction sets 11 implemented to the terminals 1 by inclusion in terminal application 17 iterations or configurations distributed by or for the associated acquirer. The transaction sets 11 in effect, by this process, embody the business data, thereby enabling the terminal to be integrated with the terminal-to-operator transaction process. Again, this aids in implementation of the invention to particular operator requirements, and particular operator network 24 and acquirer network 4 conditions.

In operation, once a terminal 1 is provided with access to the acquirer network 4 by authenticating to the acquirer network 4, the terminal application 17 is operable to create a message whose content is permitted by the acquirer network 17, but in effect determined by operator as enabling a specific operator offering or related transaction. The actual content of the message conforms to requirements of the operator in accordance with its business data. These requirements are provided by the operator as business data, which include business rules relating to functions the operator wants to provide using the operator network 24. In one particular implementation, the resulting message is communicated to the central server 5 and, if it conforms with the catalogue, may be further routed to the operator server 6 or, if it does not conform with the catalogue, may be rejected. If it is routed to the operator server 6, the message is received for processing by the operator server 6 but may first be routed to the security services 7 for authentication, and then opened (after application of security services 7), and acted on by the operator server 6. The operator server 6 acts on the contents of the message in accordance with its business data and may send a message back to the terminal following the same steps in reverse order.

The present invention, therefore, enables the operator network 24 to operate on the acquirer network 4 while ensuring the confidentiality and integrity of data between a point of sale user and the operator. The present invention also provides end to end authentication from the user of the terminal 1 (e.g. personnel of merchant where a terminal authorized for transactions with the operator is located) to the operator server. End to intermediate authentication is possible as well, specifically to the central server 5.

Financial Network

The acquirer network 4 is comprised of one or more terminals 1 deployed to end user locations, for example retailers, and may include a financial server for processing financial transactions. Many solutions are known for configuring the acquirer network 4. An acquirer is responsible for capturing and routing transactions via the processing network switches to the appropriate service entity in accordance with its financial network implementation. Data transmitted over the acquirer network 4 should not be accessible by the operator.

It should be understood that substantial variation is possible at the terminal 1 and acquirer server 3 levels (herein referred to as "client/server"). The specifications from one terminal 1 to another can vary greatly, for example with respect to connected and supported peripherals 22, sizes of key pads and screens, screen resolution, screen size, touch screen capability, security/authentication capabilities, etc. Each merchant associated with a terminal may also have its own requirements, for example how terminals 1 link to cash registers, whether the terminal 1 is integrated to the cash register or not, peripherals the merchant requires, for example outboard printers, whether a merchant logo appears on a print out generated by the terminal, prompts applicable to a merchant's transactions, controls at merchant level, for example which personnel are authorized for particular types of transactions. There may also be substantial variation at the acquirer level, for example to support legacy networks, suppliers, etc., or to implement what the acquirer might believe is the optimally safe or efficient implementation. All of this variation can be implemented by operation of the present invention. The terminal application 17 includes programming that enables interoperation with the various hardware, middleware, and software enabling terminal functions; the terminal application 17 embodies the business data via the business documents 10; and the terminal application 17 also embodies specific requirements of the acquirer including for example for data authentication (including possibly authentication of the terminal although this is typically addressed by components already provided on the terminal and with which the terminal application interoperates).

Central Server

The central server 5 provides a mechanism for linking the operator network 24 and the acquirer network 4, enabling the two closed networks to be linked as describe above. The central server 5 is linked to a server application 8, which manages communications between the terminals 1 and the central server 5.

The central server 5 performs security services and business transactions associated with the operator. The operator provides specific business data and the terminal and acquirer network support specific networking communications and application transaction sets 11. The business data is applicable to the operator network 24 and not to the acquirer network 4, whether the terminals 1 or the acquirer servers 3. And yet there is a need for transactions sets, implemented at the client/server layers that conforms to the business data. Business data can change over time, as explained more fully below. With this variation, there is a need for an efficient approach to building and maintaining the client/server code, and processing code signing by the acquirer.

The central server 5 pulls the business data, for example from the operator server 6, or the business data is pushed to the central server 5. The central server 5 interprets the business data and transaction sets 11 by the following transformations, which could be provided by a translation engine or data mirroring technique. The central server 5 may provide a first business services interface to the operator network 24, having operator business processes, and a second business service interface to the acquirer network 4 which has acquirer business processes, to provide the transformation and transportation of business documents 10 and related business data.

The central server 5 supports transaction sets 11 between a terminal 1 and the operator server 24 by enabling the transformation and transport of the transaction sets 11 and business data between the operator network 24 and acquirer network 4 and terminals 1. The transaction sets 11 are a business process with business data.

The central server first transforms business data to map to traditional printed business documents in the form of business documents 10. The business data includes information regarding the business processes and transactions provided by the operator and more particularly informs the central server of the operator's possible transactions. For example, in the context of the operator being lottery commission, the business data may include lottery host games and draw types, draw matrices, validity times, valid prices, etc. and the resulting business documents may include catalogue, order response, order change, order cancellation, dispatch ticket, receipt advice. The business data may be analyzed by the central server to generate a set of business documents that provide information about the transactions.

The central server 5 next transforms these business documents 10 to map to specific terminal secure procurement transaction sets 11 and processes. Examples of transaction sets 11 include: requesting-activity partner/role (for example a user of a terminal), requesting-activity business document (for example an order) with business data, responding-activity partner/role (for example an operator), and responding-activity document (for example an order response) with business data.

The operators may have legacy business data, which may not be recognizable to the acquirer network 4 or supported by the terminals 1. The central server 5 supports the transaction sets 11 by ensuring the business documents 10 and business data is transformed and transported appropriately to each of the request and responding parties via their respective business service interfaces.

The central server 5 can use a baseline standard set of business documents 10 and has means for transforming an operator's business data appropriately to and from business documents 10. The central server can transform the business documents 10 to be appropriate for a specific acquirer network's transport protocol, format and terminal applications.

The security services 7 linked to the central server 5 may also provide additional security for interfacing to operators and acquirers.

Figure 3:
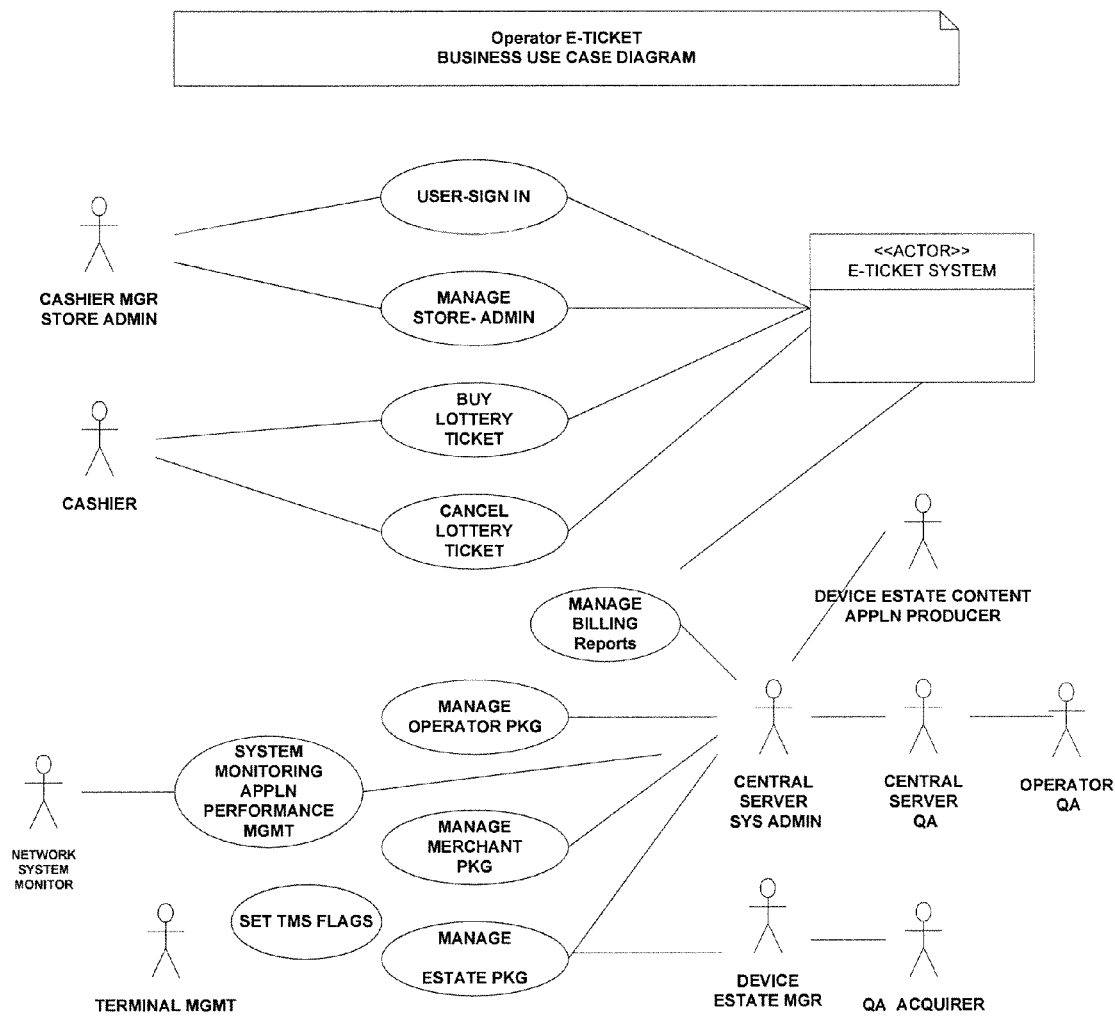
FIG. 3 illustrates a plurality of business use cases for one implementation of the invention wherein the operator is a lottery commission.
Figure 4:
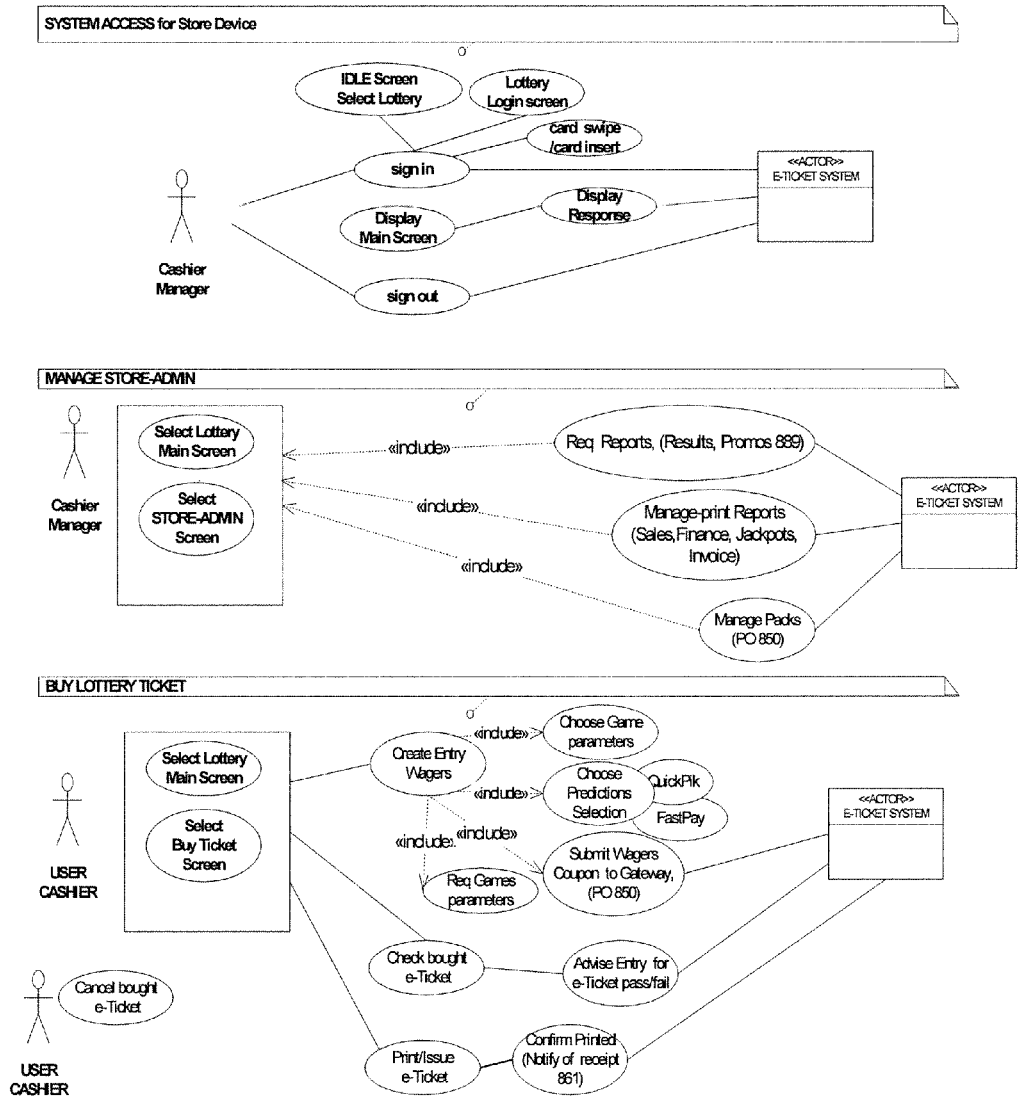
FIG. 4 further illustrates particular business use cases for one implementation of the invention wherein the operator is a lottery commission.

The functionality of the central server 5, including the business documents 10, and the design of the terminal application (or its iterations) as described above provides a platform to which developers may build terminal application iterations or configurations that either can be updated readily to address operator driven changes to business data (for example by operation of an update utility 14) or to enable efficient deployment of the multiple terminal application instances based on the merchant/merchant location/acquirer/operator variations that can occur, as further illustrated in examples below. This can be enabled by providing operators with the tools for providing up to date business data and by providing tools to developers to make it easier to roll the system out. For example, FIG. 3 illustrates a plurality of business use cases for one implementation of the invention wherein the operator is a lottery commission. FIG. 4 further illustrates particular business use cases. A plurality of business use cases may be developed based on a developer mapping a transaction flow to a plurality of steps. The present invention provides a system for enabling the mapping to carry out the cases based on developer notes.

In one implementation, the first step is to enable on the central server 5 links to the operator server 6. These links are created for the purpose of obtaining current business data. Push and pull architectures may be used, and preferably both are possible because of variation at the operator system level as well. Business documents 10 may then be created by the central server 5. The business documents 10 may be used to build iterations or configurations of the terminal application and/or server application; as a result the terminal application and/or server application are operable to process a series of transaction sets 11 at the terminal, the transaction sets 11 consistent with the business data. The application code for the terminal application 17 and server application 8 may then be signed by the acquirer, enabling security for data authentication (including the ability to activate a digital signature, enter a pin and other security aspects effectively used by the operator, even though the data is invisible to the acquirer). The code may then be distributed by or for the acquirer to the terminals 1 that the operator has signed up for. The operator then may generate credentials for authentication of users of the terminals 1 permitted by the merchants and/or operator.

In operation, the central server 5 receives from the operator server 6 a set of business data and is operable to create and edit business documents 10 to facilitate the following set-up steps for the central server 5 to execute at run time.

i) The central server 5 creates, reads or updates the operator specific business data and transforms it into business documents 10. The central server also provides transaction sets 11 for the acquirer network 4. These transaction sets 11 will be transferred from the central server 5 over the specific acquirer network 4 to the terminals 1. The business documents 10 and transaction sets 11 provide quality assurance and template checklists for the different sets of operator specific business data within the central server 5. Business documents 10 examples include orders and order responses.

ii) At setup/design time, business services particular to each acquirer including user credentials are provided from the terminal to the central server over the acquirer network. These business services enable the transformation of the business documents 10 to transaction sets 11 using the acquirer's specific protocol and formats. The business services to enable this transformation are formatted into a message which is supported for "transport" by the acquirer network 4 to enable the terminals 1 to initiate transformation of business documents 10 to the required transaction sets 11.

iii) At run time the central server 5 has populated the business documents 10 and transforms these business documents 10 to transaction sets 11 enabling the operator network 24 to operate on the acquirer network 4.

Each merchant's credentials are provided to only the associated merchant, usually by the operator providing the credentials directly using offline or online means, for example by an operator's sales agent delivering a smart card to the merchant, or delivering a smart card by mail or courier, or possibly indirectly by the operator of the central server 5, for example by download or request for activation of security cryptographic primitives.

Update Utility

As an additional step, using an update utility 14, the operator may provide to the central server 5 updated business data. The code signing usually involves the acquirer authorizing dynamic update of the terminal application 17 and/or server application 8. Dynamic updates may be made, or each transaction set may include a process whereby a request is made to the central server 5 (either directly or indirectly through the server) for the up to date business document(s) associated with the transaction set, which the central server 5 is operable to send to the terminal 1 (again directly or indirectly) thereby providing to the terminal on a real time or near real time basis the up to date business data originating from the operator and required in order to process the transaction between the user and the operator, with the terminal and operator providing the conduit.

The central server 5 may be linked to the operator server 6, and one aspect is that it is linked the operator server 6 to pull specific information and update the central server 5 to the extent that there are changes at the operator server 6 level that constitute updates to operator specific business data or transaction rules. The central server 5 may be self-updating in order to appropriately reflect regular changes at the operator level that need to be reflected in the way that transactions processed. Push and pull architectures are possible, to conform with the specific requirements of each operator, and in one embodiment the central server 5 accommodates both architectures.

Security Services

As previously mentioned, it may be of importance to either or both the acquirer and the operator that its network and data on its network be secured and not accessible to the other party, third parties or to unauthenticated parties. Both the acquirer and the operator may desire full authentication. The acquirer may require device and data authentication while the operator requires entity authentication, for example authentication of a user accessing the system, to prevent theft for example. The acquirer may also require device authentication to ensure the integrity of its network. However, the acquirer may not be concerned with the identity or invoicing of users (merchants). Rather, theft and subsequent use of a terminal by an unknown entity is a much larger concern for operators. Therefore operators may desire to authenticate the user of the terminal 1 in the merchant store.

Security services 7 enable an operator to leverage the acquirer network 4. The security services 7 provide authentication of users, entities or terminals to the operator network 24. The security services 7 also enable the acquirer to secure the acquirer network 4. Thus the present invention provides both data origination authentication for the acquirer and user entity authentication for the operator.

Both a customer anonymous mode and in a customer registered account mode may be provided.

At least three business processes may be provided for configuring the system of the invention prior to operation of a terminal in the operator network: (1) set-up/certify new operator; (2) set-up/certify new acquirer; (3) set-up/QA new merchant, which has entered into a contract with the operator, and has one or more stores and one or more terminals.

Upon operation of a terminal 1 and attempted linking to the operator network 24 another authentication is performed. Optimally, the authentication includes both authentication of the terminal 1 and of the user at multiple levels. For example, the terminal 1 may be associated with a merchant ID and store ID (particularly where the merchant has stores in various jurisdictions) and device ID, while the user is authenticated by a user ID. The security services may be configured to associate the user ID with a particular set or sets of merchant ID, store ID and device ID, preventing an unauthorized use of a terminal 1.

Blocking of transactions for example not authorized geographically could be controlled at a number of different levels. This may be performed at the central server or the operator level, to block a transaction if it is not coming from an authorized terminal, i.e. a terminal 1 in an authorized geographic location or from a merchant location that has been otherwise approved by the operator.

Other aspects of security services 7 enabled by the present invention include:

1. The central server 5 provides for multiple security services 7 across the acquirer network 4 (or portion thereof associated with the operator) and the operator 25 network 24 to support their respective industry security needs. Cryptographic security primitives may be combined to meet various security services functions and objectives. The methods of operation will exhibit different characteristics when the primitives are applied in a variety of ways and inputs.

2. The security level at the central server 5 level, or level controlled by the operator of the central server 5, is implemented to meet the current industry practices of the banking industry as it relates to the industry term called "the work factor to defeat the security objective". For this reason the invention may be implemented with unkeyed primitives, symmetric-key primitives and public/asymmetric-key primitives.

3. An example of a combination of primitives to provide the "entity authentication" is the process whereby the acquirer terminal receives via download or download activation or physical delivery the USER public and private key pair, and the public key of the central server and the public key of the operator. These keys combined with the primitives and application techniques can provide the security services.

4. Because the operator has a copy of the USER public key associated with the specific operators billing customer account, the operator may not use a certification authority and certificate revocation list processing.

5. An example of the security services is the securing of the transaction sets (enabled by the terminal application, and optionally the terminal application in cooperation with the acquirer server application) whereby the message data associated with the business documents (in effect reflecting the business data) is completed by the SSL/TLS protocol suite to provide encryption privacy, operator and central server authentication, message integrity, USER authentication and non-repudiation services.

6. Examples of cryptographic functions and generic cryptographic techniques providing Authentication services are documented in:
   a. ISO/IEC 9798 and 14888
   b. ANSI X9 documents the banking security examples
   c. US government FIPS (196) documents
   d. Example amongst others include;
      i. Public key encryption
         1. RSA
         2. El-Gamal
         3. Elliptic Curve
      ii. Digital signatures and Digital Envelopes
         1. RSA
         2. DSA
         3. EC-DSA
         4. Digital signature/envelopes per PKCS #7
      iii. Digital certificates
         1. X.509 (Public Key of ID Subject with a Digital Signature)
            a. ISO 9594-8 Versions and custom extensions of X.509

7. Security Protocol examples which can provide authentication, integrity, and privacy are:
   a. SHTTP
   b. S/MIME
   c. Internet SSL/TSL including mutual authentication
   d. Digital signature/envelopes CMS PKCS #7, RFC 2315
   e. IPsec Furthermore, as previously mentioned, in one implementation of the invention merchants may also operate their own networks of terminals, whether to reduce costs and to facilitate functionality that is not provided by the financial institution, in which case for the purposes of the invention the merchant networks are part of the acquirer network with respect to enabling communications with the operator. The merchant network may include zones or corporate networks linked to the acquirer network at the direction of the merchant based on the merchant's own authentication requirements. It should be understood that the security services include enabling the merchant's authentication requirements to be addressed for enabling communications between the merchant terminals and the operator via the merchant network and the financial institution's network.

Terminals

A terminal application 17 is delivered to the terminals 1 for acceptance by the acquirer as described above. The terminal application 17 provides authentication whereby the operator is authorized to operate its network on the acquirer's network. In other words, the terminal application 17 enables the terminal 1 to be used on the operator network 24 by authenticating the terminal 1 by way of the central server and security services. The terminal applications 17 configure the terminals 1 to provide the communication methods of the present invention. The terminal application 17 leverages the resources of the terminal 1 on which it resides and communicates with the central server 5.

The terminal applications 17 also receive from the central server 5 dynamic data 12, updates 13 to programming, and additional programming code to enable the communications described over the acquirer network 4.

Each terminal application 17 comprises: (a) a messaging utility 18 for enabling the exchange of communications with the central server 5; (b) security layers 19 with optionally a data origination authentication utility and device authentication for authenticating the terminal to the acquirer server, particularly in a client/server implementation of the terminals 1 where the terminal 1 is the client to the acquirer server 3; (c) a controller/handling and processing layer 20 for processing the transactions whether based on instructions that are part of the terminal application 17, or instructions provided dynamically by the acquirer server 3; (d) a user authentication layer 21 directed to the operator, and operable to authenticate an authorized user of the terminal 1 to the operator server 6, whether directly or indirectly by operation of the central server 5 as an authentication intermediary; and (e) a presentation layer 23 and user interface linked to the handling/processing layer for interacting with the user interfaces keypad, displays, touch screens and printing etc.

The messaging layer 18 may include means for communicating between the terminal 1 and the acquirer network 4 and central server 5. These communications may be based upon specific external interface specification of protocols, for example FTP, HTTP, HTTPS, ISO 8583, and message formats, for example proprietary bit maps as binary data, various encrypted formats. EDI X12, various HTML and various XML vocabularies, etc. This layer may also include security and authentication requirements specific to the terminal application 17 or related processes in relation to the acquirer server.

The controller/handling and processing layer 20 may be operable to hold, manage and apply transaction sets 11. The transaction sets 11, as previously mentioned, embody the operator's processes in regards to the terminal 1 and a security handler includes the operator security and authentication means or could be a separate component.

The presentation layer 23 may include a utility for managing what appears on the terminal display, keypad inputs, readers and printers, that is associated and approved by the acquirer or the operator (and optionally the merchant where the operator has agreed for example to display or print the merchant's logo on the output of a transaction) as well as other screen displays, prompts and menu selections. The user interface may support the terminal's hardware drivers and reader services, and controllers for connectivity and security, which may require support for the specific protocol and message format used by the acquirer on its terminals. It may also include security/authentication processes as it relates specifically to loading, configuration and interoperation of the application and the terminal.

Payment

The invention provides to the merchant the capability to use the merchant's terminals 1 to distribute information and products and complete the selling and payment transaction with the operator. In some cases the operator's product is a service to place funds into the customers own personal account with the operator.

At the merchant's point of sale or end user location 2, the customer or alternately the merchant may use the terminal 1 to review and choose products, make personal selections and then pay and optionally print an operator ticket in real time.

Thus the shared use of the terminal 1 enables both payment processing and sales of operator products. Each of these tasks is executed within their respective network. Additionally the invention provides the merchant with means at the terminal 1 to accept payment for multiple transactions between a customer and the operator. Multiple operator products may be offered and purchased. The customer may choose multiple products and pay the merchant on the terminal 1, optionally resulting in printing an operator ticket on the terminal 1 or a peripheral printer.

Furthermore, if the terminal 1 is used to read a customer's identification document, for example a driver's license or other identification, the operator may enroll the customer and collect customer purchase information. This may be particularly advantageous where the operator's product requires a minimum age or residency requirement to be confirmed using the terminal.

A database 15 linked to the operator server 6 may also be maintained by the operator for associating enrolled customers with profile information 16, for example to predict purchasing by the customer. For example, information about the customer and their purchases may be transmitted and stored in the operator's database 15. When a customer transacts using the terminal 1 and provides an identification document, the operator's database 15 may provide to the terminal 1 customer information for direct selections and may collect further information, augmenting that information already stored. After collecting the information the terminals 1 may transmit the information directly to the operator, or in the alternate to prepare and submit it indirectly via the third party terminal or device.

EXAMPLES

Lottery Retailer

In one implementation of the invention, it is a system to enable sales and distribution of lottery tickets, game tickets, and other entry tickets by utilizing the processing networks and devices of the financial services industry. The invention is based upon the novel approach whereby retail customers may select, purchase, pay and print these tickets, vouchers or coupons by sharing and utilizing the acquirer's electronic payments devices and infrastructure. A financial institution is the acquirer and a lottery commission is the operator.

FIG. 3 illustrates the present invention for enabling a lottery retailer to sell lottery tickets using a terminal provided by an acquirer. A plurality of terminals are provided, which either connect directly or through a merchant terminal to the Internet. A central server is provided that enables access to the operator network by the terminals.

FIG. 4 illustrates an example set of processes for enabling a merchant with a terminal to access an operator network. A trusted individual at the merchant is provided with an authentication. The trusted individual authenticates to the central server using the terminal. The central server responds by enabling the terminal to display options to the trusted individual, for example to manage merchant options on the terminal or to maintain the authentication of the terminal.

Another individual at the merchant may actually be responsible for processing transactions. For example, a customer may wish to purchase a lottery ticket or attempt to have cancelled a lottery ticket. The individual may select a lottery ticket selling function or a lottery ticket cancellation function on the terminal. The function is transmitted through the central server to the operator's server, where it is processed.

A number of payment transaction types may be performed by the user on the terminal in accordance with a typical implementation: (a) credit or debit card sale, enabling the credit cardholder to pay for goods or services; (b) refund for an earlier payment made by a cardholder; (c) transferring funds from a cardholder's account; (d) cash back, enabling a cardholder to withdraw funds from their own account at the same time as making a purchase; (e) enquiry, enabling a cardholder to view their balance; (f) an available funds enquiry, linked accounts enquiry or request for a statement of recent transactions on the account; (g) top-up, where a cardholder can use a terminal to add funds to a pre-paid account, for example a mobile phone; and (h) administrative, for any of a variety of non-financial transactions.

The invention enables the terminal to provide additional functions within the operator network environment, including for example: (a) the customer chooses to perform a transaction with the operator, enabling the terminal to initiate an authentication process with security services and linking to the operator network to activate and run operator functions; (b) the user initiates the terminal's link to the operator network by an event which may be for example a keypad entry on the terminal or the terminal performing an access activation through different trigger events such as a magnetic cards read, bar code read, RFID, or near field communication; (c) the user uses the terminal as a sales channel in accordance with business data from the operator and the customer or user selects the product for pending purchases. A pending purchase may need to be configured by the user who may choose a number of ways to configure and make selections in accordance with the business data. The user may choose to manually enter their selection choices, or in particular implementations may accept random generated selections or repeat prior selections. In the case of manual selections, the user inputs are made on the terminal keypad and sent to the operator's server for validation against the business data. In some cases customer selection slip forms are read by a device and the selections or marks are converted into the selections. The entry is accepted or rejected by the operator's business data. If the entry is accepted a printout may be generated. Customer and/or merchant information may also be packaged with the printout. In some cases, subject to business data, the transactions may be canceled by the purchaser. The terminal is capable of requesting certain management reports such as a daily sales report, weekly reconciliation invoicing, etc.

Figure 5:
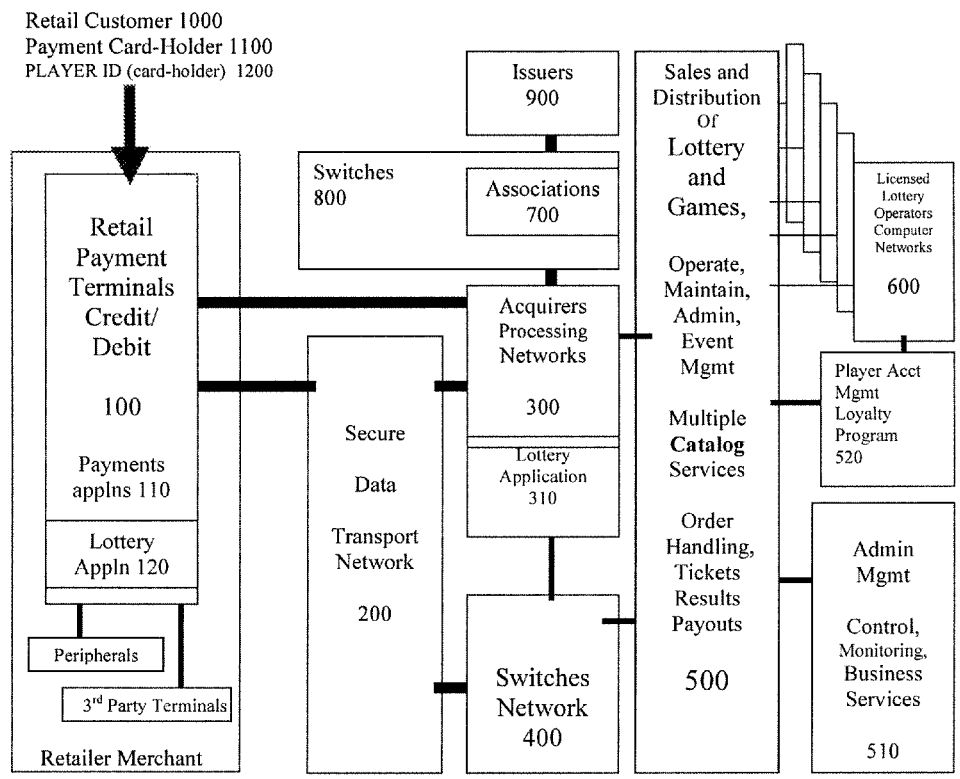
FIG. 5 illustrates the context of four subsystems of the invention wherein it is implemented as a lottery sales system.

FIG. 5 illustrates the context of four subsystems of the invention 120, 500, 510, 310 wherein it is implemented as a lottery sales system. Standard retail payment systems for credit and debit payments use the systems 100, 110, 200, 300, 400, 700, 800, 900. The objective of the invention is to enable and utilize devices and systems 100, 200, 300, 400 of the payments processing networks into a multipurpose network to act as a sales and distribution channel. The invention enables lottery and gaming content from system 600 to be sold and payment accepted at a merchant who is in possession of system 100 having invention subsystem 120. Additionally for the purposes of credit and debit card payment for the ticket purchases the invention uses the systems 300, 700, 800 and 900. Payment application 110 in system 100 requires the invention manage and comply with all of the rules, constraints and interfaces for the standard retail payment system in order to have shared processes of ticket sales with payment.

System 100, a payment terminal, receives and loads the appropriate version of the invention's approved lottery application 120, from the invention subsystem 500 via either the systems 400 and 200, or in some cases from the acquirer network system 300. Many different makes and models of payment devices, system 100, exist. The rights and certifications requirements to install the invention software application 120 into subsystem 100 are subject to both the make and model technology make-up and the device estate owner and the acquirer 300 requirements. In some cases the device estate owner is also 300 and in other cases it is the merchant or a third party. The data communications to and from 100, have network security and may be one or more choices of various types of wired links or wireless transmission links.

The lottery application 120 is a software application which has user interfaces for the customer, merchant, admin and maintenance. FIG. 6 illustrates an example of a print-out of a lottery entry ticket of the terminal 100 resulting from an example usage of the lottery application 120. Application 120 supports on 100 the display presentation and user input and may be keypad or touch-screen. Application 120 supports data communications for wireless, wired dial-up and LAN to broadband connectivity.

Application 120 supports the local connected peripherals such as bar code reading of tickets and selection slips, customer display units, retailer display units, ticket checker and ticket validation processes, and external printers.

The invention software application subsystem 500 provides services and content to the invention's system 110 to enable the content and transactions which originated in system 600. Invention subsystem 500 provides services in the form of a set of transactions which perform and execute and record business processes and transactions between the lottery commission, retail merchant, and customer.

This invention application 120 providing service at 100, may sometimes be provided transactions indirectly via 300 and invention subsystem 310, or directly through the systems and networks 200 and 400, but is based upon transactions with subsystem 500. Subsystem 500 is the repository for lists and catalogs of games and all order handling business documents for the sales and distribution processes. Subsystem 500 interfaces to one or many operators, 600, either directly or via 520, a third party player account system or enterprise system. When required the subsystem 500 may exist in one more licensed jurisdiction as needed. Subsystem 500 may also act as an accumulator and forwarding service for customer data.

The subsystem 310 is an adapter within a certified secure environment of the acquirer 300. Subsystem 310 acts as a proxy for 500 when needed to meet the acquirer and estate owner needs for communicating appropriately with devices 100. As many 310 may be used as is needed to satisfy different Acquirers and their respective mix and needs for the multiple variety of types of 100 makes and models of devices communicating with 300.

The subsystem 510 is a management and monitoring tool for subsystem 500. Subsystem 510 is intended to create game product catalogs, and maintain, activate and publish catalogs, which contain items, pricing and promotions. The subsystem 510 has tools to manage the catalogs pre-game offer, game validation, game start and game closing, and the post-game results, entry and publication. In some cases it is also used to publish winning numbers and winning tickets. Subsystem 510 also has tools to monitor the events associated with the on-going businesses of multiple operator systems 600.

Invention subsystem 500 provides the highest level of transaction services between the originating multiple products offered by multiple operators 600 and the very larger number of merchants 100, associated with many regional acquirers 300.

Subsystems 510 and 500 create a business document appropriate for each jurisdiction and each sales entry channel, the business documents indicating product/services with itemized sales pricing, and promotions catalogs. System 500 upon request sends directly or indirectly the business documents to 110 which is to include live valid games to be played in the jurisdiction. Subsystem 500 obtains from many operators 600 the necessary information to define games and game validity. Subsystem 110 may configure locally all the product selections or may request from subsystem 500 information for the build either being randomly generated selections or from prior selections as registered by the customer. Subsystem 500 may receive from the merchant 100 a request for a product as a built quote document and provides a validity response to the request for quote which includes a valid time to purchase entry ticket for a defined cost. Subsystem 500 may alternatively receive from the merchant 100 a purchase order document and responds with a purchase order acknowledgement document stating valid, error, accepting or rejecting based upon business rules or exclusions as provided by the business data. Subsystem 500 may also receive from the merchant 100 a purchase order change request and responds with a purchase order changes request acknowledgement. Subsystem 500 may also receive from the merchant 100 a payment notice and responds with ticket entry successful or failed so that the merchant 100 can print the ticket or failure notice. Subsystem 500 may also receive from the merchant 100 for those customers who have existing operator accounts, certain customer ID information and may respond with customer's national currency (e.g. dollar, euro) balance or loyalty reward points balance. Subsystem 500 may also receive from the merchant 100 an application from a customer to enroll and register for an operator account based upon information read by 100 from their drivers license.

Example Usage and Transactions

Continuing with a particular implementation of the invention, wherein it is a system to enable sales and distribution of lottery tickets, game tickets, and other entry tickets by utilizing the processing networks and devices of the financial services industry, the following example processes are representative of the operation of the present invention.

1. A merchant wishes to sell lottery tickets. The merchant requests the acquirer make available the acquirer's terminal signed application. The terminal's existing or proprietary application makes available the terminal application for download. The terminal application enables entity authentication.

2. The merchant as a user of the terminal selects lottery from an IDLE screen display and is prompted to "sign-on".
   a. The user interface of the terminal prompts the user to "Enter/Swipe/Insert lottery issued credentials+Press OK"; the user complies.
   b. The user interface of the terminal prompts the user to "Enter User Password number+Press OK"; the user complies.
   c. The terminal application performs a cryptographic technique and the terminal provides requesting-sign-on with credentials and security information.
   d. The request-sign-on is received by the acquirer server, is recognized and is flagged for packaging and forwarding with certain merchant, store and terminal data.
   e. The central server performs its security and routing rules, and forwards security information to the operator server.
   f. When authenticated (pass/fail) by the operator server, then operator server provides responding-sign-on and security-protocols to the central server and the terminal.
   g. The terminal receives security responses and necessary cryptographic information for connectivity with the central server and the operator.
   h. OUTPUT, Print Sign-on receipt.
   i. OUTPUT, Print Sign-on message.

j. OUTPUT, Display IDLE display with a prompt indicating a lottery selection.
k. Subject to response to sign on, then terminal may request a download of application code from 310 or 300 central server, for all operator transaction sets, and terminal receives and authenticates the data origination and data integrity. Application includes a reformatted operator catalog of game information which is reformatted specific to the acquirer protocol/format and terminal resources.

3. Player/recipient expresses interest to user/merchant to buy a lottery ticket.

4. The user, for example a merchant, can activate the terminal application from the display prompt and Function keypad push.
a. The user is prompted by display to create Order.
b. The user reviews the displayed choices of the catalog.
c. The user makes selections which become line items in a Requesting Order document+OK.
d. The terminal application performs cryptographic technique and submits a request for Order.
e. Request for Order is recognized by the acquirer and packaged with certain merchant, store and terminal. The central server performs its security, routing rules, and forwards security information and package to operator.
f. The operator server performs security process and creates a response having specific business data/information.
g. The operator server responds to Order, returns the business data to the central server.
h. The central server transforms the business data into Order Response document for eventual transformation transport to terminal.
i. The central server packages the Order Response transformed specifically for the acquirer network and terminal for printing.
j. Merchant is prompted to Print OK, and selects OK on the terminal to print.
k. A printed message is transported to the central server and to the operator server.
l. The terminal outputs a ticket.
m. (As E-ticket contains sensitive information as it relates to player, their selections and ticket control number, which may be returned both encrypted and may be a graphic image in the form not machine vision readable.)

5. Sign-off
a. Send sign-off request and receive sign-off response.
b. OUTPUT, Print sign-off slip.
c. Set internal state to disable wagering and tickets functions.

In particular examples, the following transaction sets may be provided for a lottery ticket purchase:

1. Buy TICKET for lottery draw game, Quick Pick
a. Select DRAW Game Type
b. Select Boards
c. Select Number of draws
d. Select Spiel/Encore and if yes, the number of Encore
e. Send Wager-coupon Order document
f. Receive Order Response of Wager-Coupon info in form of e-Ticket
g. OUTPUT; Print e-ticket
h. Acknowledge print operation 2. Buy TICKET for KENO game event
a. Select KENO
b. Select Play Category (usually 2-10, but maybe up to 15)(Selections per Board) (TBD if to allow Xnumbers per board)
c. Select Number of Draws
d. Select Amount per Board ($1, 2, 5, 10)
e. Play Spiel game (Encore)
f. If yes to encore then select number of Encores
g. OUTPUT, Print ticket Each of the operations performed by the merchant or user of the terminal 100 may be recorded or tracked by the acquirer server or the operator server, depending upon which network the terminal 100 is linked to at a given time, or may be recorded or tracked by the central server. A database may be provided for collecting or gathering data regarding these operations. The database may be accessible to the acquirer and/or the operator, or the acquirer and operator may be provided with access to subsets of data. This data may be used for data analysis, reporting, business intelligence or other business needs by the operator, acquirer or third party.

Additionally, as previously mentioned, a customer or alternately a merchant may use the terminal to review and choose products, make personal selections and then pay and optionally print an operator ticket in real time. Thus the shared use of the terminal 100 enables both payment processing and sales of operator products. Each of these tasks may be executed within their respective network but could also be brokered by the third party operating the central server or another broker. The broker may act as an intermediary to process payments as between the merchants and the operator.

Furthermore, different client/server configurations are possible whereby aspects of the business data (through the business documents for example) may be controlled at the acquirer server application level whereby the transaction sets in effect are dynamically served to the clients (terminals) by the acquirer server application.

Other applications include the use of the terminal and networks to create, store, read, update and delete customers' favorite lottery selections, for example games, and numbers to be used to print on the tickets. A database could be provided for binding these selections and numbers to a customer's lottery issued card, loyalty card with machine readable information, for example bar code, magnetic stripe, or contactless card, or loaded into a smart card. These numbers may be anonymously stored or bound to each customer's account or an identification card. A merchant or the customer would provide the card to be read, which initiates the terminal application to obtain the selections and numbers and print the favorites and numbers.

The central server may provide an analysis and/or reporting utility. While an acquirer or an operator may not want to share with the other party the data communicated over its network, the central server as a trusted intermediary and operable to access the data may generate and provide analytics, reports, and other summaries of the data for use by the other party. For example, while the operator may not want the acquirer to have knowledge of the particular transactions being made over the operator network, the central server may provide the acquirer with reports regarding the number, frequency or amount of the transactions in a given day, month or year.

Additionally, the central server may provide connectivity to the operator acting as a trusted intermediary who contractually is an authenticated single master merchant for a large quantity of sub-merchants.

Furthermore, the present invention could be used for providing event ticketing, for example for sports and entertainment or could be used for providing public transit tickets.

The invention claimed is:

1. A network comprising:
 a first computer network including at least one network device and a first network server;
 a second computer network including a second network server and having a security requirement incompatible with that of the first computer network; and
 a computer server trusted by the computer networks and configured to provide the at least one network device with at least one transaction set, the at least one transaction set when authenticated by the at least one network device facilitating end-to-end communications between the at least one network device and the second computer network via the computer server and the first computer network and implementing on the at least one network device via the end-to-end communications a network service offered by the second computer network,
 wherein the first computer network is configured to authenticate the at least one network device, and one of the computer server and the second computer network is configured to authenticate a user of the at least one network device from user authentication information received from the at least one network device,
 wherein the second computer network is configured to provide the network service to the at least one network device and the computer server is configured to pass the end-to-end communications of the network service between the at least one network device and the second computer network both only after the first computer network authenticates the at least one network device and the one of the computer server and the second computer network authenticates the user of the at least one network device from the received user authentication information, and
 wherein the computer server is configured to maintain communications between the at least one network device and the first network server confidential from communications between the at least one network device and the second network server.

2. The network according to claim 1, wherein the security requirement of the first computer network comprises authentication of data originating from the at least one network device, and the security requirement of the second computer network comprises authentication of an entity operating the at least one network device.

3. The network according to claim 1, wherein the computer server is configured to implement the network service over the first computer network while maintaining the security requirement of the first computer network.

4. The network according to claim 1, wherein the computer server is configured to receive business data from an administrator of the second computer network and to generate the at least one transaction set from the business data, the business data including rules for providing the network service to the at least one network devices.

5. The network according to claim 1, wherein the computer server is configured to provide the at least one network device, in real-time, with updated data associated with the at least one transaction set and required for processing of a transaction over the second computer network.

6. The network according to claim 1, wherein the at least one network device is configured for communication via the first computer network, and for communication via the second computer network via the computer server.

7. The network according to claim 1, wherein the security requirement comprises authentication, the at least one network device is configured to facilitate authentication of the at least one network device to the first network server, and the computer server is configured to facilitate authentication to the second network server of an entity operating the at least one network device.

8. The network according to claim 1, wherein the computer server is configured to generate the at least one transaction set from business documents defining parameters for the communications between the at least one network device and the second computer network.

9. The network according to claim 8, wherein the security requirement comprises integrity, the computer server is configured to receive transaction sets from the at least one network device via the first computer network and to forward to the second computer network the transaction sets received from the at least one network device in accordance with satisfaction of integrity requirements imposed on the received transaction sets by the business documents.

10. The network according to claim 1, wherein the computer server is configured to control access to the second computer network by the at least one network device, and to control access by the second computer network to the at least one network device in accordance with a state of the at least one transaction set.

11. A network comprising:
 a plurality of first computer networks each including a respective network device and a respective first network server;
 a plurality of second computer networks each including a respective second network server and having a security requirement incompatible with those of the first computer networks; and
 a computer server trusted by the computer networks and configured with business documents defining parameters for communications between the computer networks, the computer server being further configured to receive a transaction set from one of the network devices over the respective first computer network, to determine an appropriate one of the second computer networks for the received transaction set from the business documents, and to facilitate end-to-end communications of the received transaction set between the one network device and the one second computer network via the computer server and the respective first computer network,
 wherein said one first computer network is configured to authenticate the one network device, and one of the computer server and said one second computer network is configured to authenticate a user of the one network device from user authentication information received from the one network device,
 wherein said one second computer network is configured to provide the network service to the one network device and the computer server is configured to pass the end-to-end communications of the network service between the one network device and the one second computer network both only after the one first computer network authenticates the one network device and the one of the computer server and said one second computer network authenticates the user of the one network device from the received user authentication information, and
 wherein the computer server is configured to maintain communications between the one network device and the one first network server confidential from communications between the one network device and the one second network server.

12. A method for combining a first computer network with a second computer network, the first computer network including at least one network device and a first network server, the second computer network including a second network server and having a security requirement incompatible with that of the first computer network, the method comprising:
- a computer server trusted by the computer networks generating at least one transaction set from at least one business document defining parameters for communications between the at least one network device and the second computer network;
- the first computer network authenticating the at least one network device and one of the computer server and the second computer network authenticating a user of the at least one network device from user authentication information received from the at least one network device,
- the computer server providing the at least one network device with the at least one transaction set;
- the at least one network device authenticating the at least one transaction set and using the authenticated at least one transaction set to facilitate end-to-end communications between the at least one network device and the second computer network via the computer server and the first computer network and to implement on the at least one network device via the end-to-end communications a network service offered by the second computer network, and
- the second computer network providing the network service to the at least one network device, and the computer server passing the end-to-end communications of the network service between the at least one network device and the second computer network both only after the first computer network authenticates the at least one network device and the one of the computer server and the second computer network authenticates the user of the at least one network device from the received user authentication information, and
- the computer server maintaining communications between the at least one network device and the first network server confidential from communications between the at least one network device and the second network server.

13. The method according to claim 12, wherein the security requirement of the first computer network comprises authenticating data originating from the at least one network device, and the security requirement of the second computer network comprises authenticating an entity operating the at least one network device.

14. The method according to claim 12, wherein the using the authenticated at least one transaction set to facilitate end-to-end communications comprises the computer server implementing the network service over the first computer network while maintaining the security requirement of the first computer network.

15. The method according to claim 12, wherein the generating at least one transaction set comprises the computer server receiving business data from an administrator of the second computer network and generating the at least one business document from the business data, the business data including rules for providing the network service to the at least one network device.

16. The method according to claim 12, further comprising the computer server providing the at least one network device, in real-time, with updated data associated with the at least one transaction set and required for processing of a transaction over the second computer network.

17. The method according to claim 12, wherein the security requirement comprises authentication, the at least one network device is configured to facilitate authentication of the at least one network device to the first network server, and the using the authenticated at least one transaction set to facilitate end-to-end communications comprises the computer server facilitating authentication to the second network server of an entity operating the at least one network device.

18. The method according to claim 12, wherein the security requirement comprises integrity, and the using the authenticated at least one transaction set to facilitate end-to-end communications comprises the computer server receiving transaction sets from the at least one network device via the first computer network and forwarding to the second computer network the transaction sets received from the at least one network device in accordance with satisfaction of integrity requirements imposed on the received transaction sets by the at least one business document.

\* \* \* \* \*